United States Patent
Kondo et al.

(10) Patent No.: US 9,181,446 B2
(45) Date of Patent: Nov. 10, 2015

(54) INK COMPOSITION AND PRINTING METHOD

(71) Applicant: Nippon Kayaku Kabushiki Kaisha, Tokyo (JP)

(72) Inventors: Asako Kondo, Tokyo (JP); Yuji Suzuki, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/443,842

(22) PCT Filed: Nov. 25, 2013

(86) PCT No.: PCT/JP2013/081622
§ 371 (c)(1),
(2) Date: May 19, 2015

(87) PCT Pub. No.: WO2014/084161
PCT Pub. Date: Jun. 5, 2014

(65) Prior Publication Data
US 2015/0284577 A1   Oct. 8, 2015

(30) Foreign Application Priority Data
Nov. 28, 2012 (JP) ................................ 2012-259398

(51) Int. Cl.
| | |
|---|---|
| *B41J 2/015* | (2006.01) |
| *C09D 11/36* | (2014.01) |
| *C08K 5/23* | (2006.01) |
| *C09D 11/108* | (2014.01) |
| *C08K 3/04* | (2006.01) |
| *C08K 5/3437* | (2006.01) |
| *C09D 11/322* | (2014.01) |
| *C09D 11/38* | (2014.01) |
| *C09D 11/40* | (2014.01) |
| *C09D 11/30* | (2014.01) |

(52) U.S. Cl.
CPC . *C09D 11/36* (2013.01); *C08K 3/04* (2013.01); *C08K 5/235* (2013.01); *C08K 5/3437* (2013.01); *C09D 11/108* (2013.01); *C09D 11/322* (2013.01); *C09D 11/38* (2013.01); *C09D 11/30* (2013.01); *C09D 11/40* (2013.01)

(58) Field of Classification Search
None
See application file for complete search history.

(56) References Cited

U.S. PATENT DOCUMENTS

| | | | |
|---|---|---|---|
| 2012/0242741 A1* | 9/2012 | Hasegawa et al. | 347/20 |
| 2014/0363642 A1 | 12/2014 | Kawaguchi et al. | |

FOREIGN PATENT DOCUMENTS

| | | |
|---|---|---|
| EP | 1059341 B1 | 11/2006 |
| EP | 2671926 A1 | 12/2013 |
| JP | H 09-143407 | 6/1997 |
| JP | 2003-128968 A | 5/2003 |
| JP | 2006-83267 A | 3/2006 |
| JP | 4016483 B | 12/2007 |
| JP | 2011-162711 A | 8/2011 |
| JP | 2011-246633 | 12/2011 |
| JP | 2012-177110 A | 9/2012 |
| JP | 3534395 B | 3/2014 |
| WO | WO2013/115071 A1 | 8/2013 |

OTHER PUBLICATIONS

International Search Report in PCT/JP2013/081622, dated Dec. 24, 2013.

* cited by examiner

*Primary Examiner* — Lisa M Solomon
(74) *Attorney, Agent, or Firm* — Knobbe Martens Olson & Bear LLP

(57) ABSTRACT

Provided are: an ink composition for ink-jet printing use, which has good re-dispersibility after being dried and does not undergo the change in properties of the ink even when stored for a long period; and an ink-jet printing method and a dyeing method each using the ink composition. The ink composition according to the present invention comprises: a pigment; water; a polymer (D) composed of at least two monomers independently selected from the group consisting of a monomer (A), a monomer (B) and a monomer (C) respectively represented by specific formulae; a styrene-butadiene resin; a water-soluble organic solvent; and a nonionic surfactant.

10 Claims, No Drawings

INK COMPOSITION AND PRINTING METHOD

This application is the U.S. National Phase under 35 U.S.C. §371 of International Application PCT/JP2013/081622, filed Nov. 25, 2013, designating the U.S., and published in Japanese as WO 2014/084161 on Jun. 5, 2014, which claims priority to Japanese Patent Application No. 2012-259398, filed Nov. 28, 2012, the entire contents of which are incorporated herein by reference.

TECHNICAL FIELD

The present invention relates to an ink composition used for inkjet printing that contains a pigment, water, a specific polymer, a styrene-butadiene resin, a water-soluble organic solvent, a nonionic surfactant and an alkyl ether solvent, and further relates to an inkjet printing method and a dyeing method using the ink composition.

BACKGROUND ART

Inkjet recording is widely used as a printing method for offices and homes as digitalization of information progresses. In recent years, a large number of applications such as commercial printing and printing on textile have been developed. As applications of inkjet recording are widely developed, as a coloring agent used in an inkjet ink, not only a conventional water-soluble dye such as an acid dye or a direct dye, but also a water-insoluble coloring agent is used according to the application; in other words, various coloring agents such as a disperse dye and a pigment are used.

In general, it is known that a recording image using a water-soluble dye as a coloring agent has low durability to light, ozone, water and the like.

On the other hand, it is known that a recording image using a pigment as a coloring agent is excellent in various types of toughness to light, ozone, water and the like.

However, when an ink containing a water-insoluble coloring agent such as a pigment loses water due to a certain factor and is thereby brought into a dried state, the dispersed state of the pigment is destroyed, with the result that the pigment is disadvantageously aggregated. It is impossible to return the once aggregated pigment in the ink as described above to the dispersed state even by the addition of a liquid medium such as water (since its redispersibility is poor), and thus an improvement is highly required.

In particular, it is required for an ink containing a pigment to be stable for a long period of time. It is known that a pigment whose particles are present in a dispersed state in an ink undergoes a sedimentation phenomenon caused by the aggregation of the pigment particles over time. Hence, disadvantageously, for example, a concentration gradient is produced in the ink and it is impossible to obtain the initial printing characteristics. Furthermore, the aggregated particles clog in a nozzle, and thus it is impossible to discharge the ink, with the result that improvement is highly required to help solve such problems.

As an inkjet ink using a pigment, there is an ink disclosed in Patent Document 1. This is a dispersed ink composition using a polymer dispersing agent. Patent Document 2 discloses an ink composition using a self-dispersed pigment.

In recent years, a method of mixing a resin into an ink to perform curing and fixing with thermal processing on a record-receiving material has also been known, for example, that disclosed in Patent Documents 3 and 4.

Patent Document 1: Japanese Patent No. 3534395
Patent Document 2: Japanese Patent No. 4016483
Patent Document 3: Japanese Unexamined Patent Application, Publication No. 2011-246633
Patent Document 4: Japanese Unexamined Patent Application, Publication No. H09-143407

DISCLOSURE OF THE INVENTION

Problems to be Solved by the Invention

An object of the present invention is to provide a pigment ink composition used for inkjet printing that is excellent in redispersibility and storage stability, and an inkjet printing method and a dyeing method using it.

Means for Solving the Problems

The present inventors and others have studied thoroughly to achieve the above object, with the result that they find that the above object can be achieved with an ink composition containing a pigment, water, a specific polymer, a styrene-butadiene resin, a water-soluble organic solvent and a nonionic surfactant, and thus realized the present invention. In other words, the present invention relates to items [1] to [9] below.

[1]
An ink composition used for inkjet printing, the ink composition including: a pigment, water, a polymer D formed from at least two types of monomers selected from a group consisting of a monomer A, a monomer B and a monomer C represented by formula (1) below, a styrene-butadiene resin, a water-soluble organic solvent and an nonionic surfactant;
the monomer A: a monomer in which R is a hydrogen atom in formula (1) below,
the monomer B: a monomer in which R is a C1-C4 alkyl group in formula (1) below and
the monomer C: a monomer in which R is an aryl group or an aryl C1-C4 alkyl group in formula (1) below.

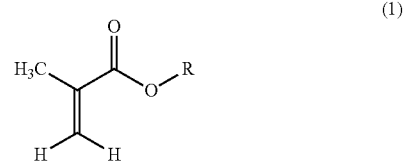

[2]
The ink composition according to the item [1], where contents of individual components in a total mass of the ink composition are as follows:
the pigment: 1 to 15 mass %,
the polymer D: 0.1 to 15 mass %,
the styrene-butadiene resin: 1 to 20 mass %,
the water-soluble organic solvent: 10 to 45 mass %,
the nonionic surfactant: 0.01 to 5 mass % and
remaining part: water.

[3]
The ink composition according to the item [1] or [2], where the styrene-butadiene resin is a carboxy-modified styrene-butadiene resin.

[4]
The ink composition according to any one of the items [1] to [3], where the water-soluble organic solvent contains a polyglyceryl ether and a C2-C6 diol.

[5]

The ink composition according to any one of the items [1] to [4], where at 25° C., the surface tension is 20 to 40 mN/m, and the viscosity is 2 to 10 mPa·s.

[6]

An inkjet printing method of performing printing by discharging, in response to a recording signal, a droplet of the ink composition according to any one of the items [1] to [5] and attaching the droplet on a record-receiving material.

[7]

The inkjet printing method according to the item [6], wherein the record-receiving material is a fiber selected from a group consisting of polyester, cellulose, polyamide and a natural fiber, a mixed fiber containing these fibers or a fabric containing these fibers.

[8]

An inkjet dyeing method of performing dyeing by dyeing, to the record-receiving material, the pigment contained in the ink composition attached on the record-receiving material using the inkjet printing method according to the item [6] or [7] by steaming or baking processing.

[9]

The inkjet dyeing method according to the item [8], wherein a processing temperature of the steaming or baking processing is 80 to 250° C., and a processing time falls within a range of 10 seconds to 30 minutes.

[10]

A dyed product that is dyed by the inkjet dyeing method according to the item [8] or [9].

Effects of the Invention

With the present invention, it is possible to provide a pigment ink composition used for inkjet printing that is excellent in redispersibility and storage stability, and a dyeing method and an inkjet printing method using it.

PREFERRED MODE FOR CARRYING OUT THE INVENTION

The present invention will be described in detail below. In the following description, unless otherwise particularly stated, an "ink composition" means the "(pigment) ink composition used for inkjet printing" described above. Unless otherwise particularly stated, in the present specification including examples and the like, "%" and "parts" are based on mass.

[Pigment]

The pigment described above is not particularly limited, and a known pigment can be used. As pigments, inorganic pigments, organic pigments, extender pigments and the like are known.

Examples of the inorganic pigment described above include a carbon black, a metal oxide, a hydroxide, a sulfide, a ferrocyanide and a metal chloride. Among them, as a black pigment, a carbon black is preferable.

There are various types of carbon black, and examples thereof include: a thermal black and an acetylene black obtained by a thermal decomposition method; and an oil furnace black, a gas furnace black, a lamp black, a gas black, and a channel black obtained by an incomplete combustion method.

Among them, as the carbon black, an acetylene black, an oil furnace black, a gas furnace black, a lamp black, a channel black or the like is preferable.

Specific examples of the carbon black include: Raven760ULTRA, Raven780ULTRA, Raven790ULTRA, Raven1060ULTRA, Raven1080ULTRA, Raven1170, Raven1190ULTRA II, Raven1200, Raven1250, Raven1255, Raven1500, Raven2000, Raven2500ULTRA, Raven3500, Raven5000ULTRA II, Raven5250, Raven5750 and Raven7000 (manufactured by Columbia Carbon Co., Ltd.); Monarch700, Monarch800, Monarch880, Monarch900, Monarch1000, Monarch1100, Monarch1300, Monarch1400, Regal1330R, Regal1400R, Regal166OR and Mogul L (manufactured by Cabot Co., Ltd.); Color Black FW1, Color Black FW2, Color Black FW2V, Color Black FW200, Color Black 5150, Color Black 5160, Color Black S170, Printex 35, Printex U, Printex V, Printex 140U, Printex 140V, SpecIal Black 4, SpecIal Black 4A, SpecIal Black 5 and Special Black 6 (manufactured by Degussa co., Ltd.); and MA7, MA8, MA100, MA600, MCF-88, No. 25, No. 33, No. 40, No. 47, No. 52, No. 900 and No. 2300 (manufactured by Mitsubishi Chemical Corporation).

As a white pigment, a metal oxide is preferably used. Examples of the metal oxide include a zinc oxide, a titanium oxide and a zirconia oxide, and a titanium oxide is preferable. Examples of the type of titanium oxide include a rutile type and an anatase type. The titanium oxide may be used as powder without being processed or a titanium oxide with its surface processed with silicon dioxide, an aluminum oxide, a zirconium oxide, a zinc oxide, or an organic substance having a hydroxyl group may be used. Among them, the titanium oxide with its surface processed is preferable.

Specific examples of the titanium oxide include: DUAWHITE TCR-52, TITONE R-32, TITONE R-7E, TITONE R-21, TITONE R-62N and TITONE R-42 (manufactured by Sakai Chemical Industry Co., Ltd.); TIPAQUE CR-50, TIPAQUE CR-50-2, TIPAQUE CR-58, TIPAQUE CR-60, TIPAQUE CR-80 and TIPAQUE CR-90 (manufactured by Ishihara Sangyo Kaisha, Ltd.); TITANIX JA-600A and TITANIX JR-605 (manufactured by Tayca Corporation); and ST-455, ST-455WB, ST-457SA and ST-457EC (manufactured by Titan Kogyo Co., Ltd.).

Examples of the organic pigment described above include: an azo pigment having at least one azo group in its molecule, a phthalocyanine pigment, a quinacridone pigment, an isoindolinone pigment, a dioxazine pigment, a perylene pigment, a perinone pigment, a thioindigo pigment, an anthraquinone pigment and a quinophthalone pigment.

Specific examples of the organic pigment include: yellow pigments such as C. I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 155, 180, 185, 193, 199 and 202; red pigments such as C. I. Pigment Red 5, 7, 12, 48, 48:1; 57, 88, 112, 122, 123, 146, 149, 166, 168, 177, 178, 179, 184, 185, 202, 206, 207, 254, 255, 257, 260, 264 and 272; blue pigments such as C. I. Pigment Blue 1, 2, 3, 15, 15:1, 15:2, 15:3, 15:4, 15:6, 16, 22, 25, 60, 66 and 80; violet pigments such as C. I. Pigment Violet 19, 23, 29, 37, 38 and 50; orange to brown pigments such as C. I. Pigment Orange 13, 16, 36, 34, 43, 68, 69, 71 and 73; green pigments such as C. I. Pigment Green 7, 36 and 54; and black pigments such as C. I. Pigment Black 1.

Examples of the extender pigment described above include: silica, calcium carbonate, talc, clay, barium sulfate and white carbon. Although these extender pigments may be used singly, they are normally used together an inorganic pigment or an organic pigment.

As the pigments described above, a single pigment is normally used. However, as necessary, two or more types of pigments may be used together. Examples thereof include a combination of an organic pigment and an extender pigment and a combination of an organic pigment and an inorganic pigment. In order to improve flowability, in addition to an organic pigment and an inorganic pigment, an extender pigment may further be used in addition.

Furthermore, in order to adjust the hue of a dyed product, two or more types of pigments selected from inorganic pigments and organic pigments can be used together. The hue adjustment described here is performed so as to achieve, for example, a dyed product with clear light and dark colors and a wider color range of dyeing. In order to achieve the purposes described above, a few types of organic pigments can be used together to adjust the hue to the desired hue.

[Polymer D]

As a method of stabilizing a pigment dispersion product in an aqueous medium (which means a mixed solvent of water, a water-soluble organic solvent other than an alkyl ether solvent that will be described later, and an alkyl ether solvent), a method is generally used that stabilizes the pigment dispersion product, using a dispersing agent such as a resin, by entropy, an ion repulsive force, a steric repulsive force or the like. Here, the dispersing agent can be considered to have the following properties: the dispersing agent has a hydrophilic part and a hydrophobic part, the hydrophobic part is adsorbed to the surface of the pigment and the dispersing agent is dispersed to the aqueous medium in the hydrophilic part. Furthermore, depending on the state where the hydrophobic part is adsorbed to the surface of the pigment, the pigment can be dissolved in the aqueous medium. The polymer D described above can be used as the dispersing agent having the properties described above.

The polymer D is a polymer that is obtained by polymerizing at least two types of monomers selected from a group consisting of the monomer A, the monomer B and the monomer C represented by formula (1) described above. Preferably, at least one type is selected from each of the monomer A, the monomer B and the monomer C.

The polymer D may be any of a random copolymer, an alternating copolymer, a block copolymer and a graft copolymer of these monomers.

The weight average molecular weight of the polymer D is normally 10000 to 60000, is preferably 10000 to 40000 and is more preferably 10000 to 30000. When the weight average molecular weight falls within this range, the stability of a pigment dispersing liquid is satisfactory.

When mgKOH/g is used as the unit, the acid value of the polymer D is normally 50 to 300, is preferably 90 to 200 and is more preferably 100 to 150. When the acid value is excessively low, the solubility of the polymer D in water or the aqueous medium may be lowered whereas when the acid value is excessively high, the chromogenic property thereof may be lowered.

Examples of the polymer D include Hairosu X VS-1202 made by Star light PMC Corporation (a random polymer which is formed of a methyl methacrylate-butyl methacrylate-methacrylic acid, whose acid value is 140 mgKOH/g and whose weight average molecular weight is 11000).

The polymer D may be used, as necessary, after the acid value is neutralized. The degree of neutralization is 100% when the neutralization is performed by the theoretical equivalent of the acid value of the polymer D. In the ink composition, the degree of neutralization of the polymer D is normally 50 to 200%, is preferably 80 to 150% and is more preferably about 100 to 120%.

Examples of a neutralizing agent used for the neutralization of the polymer D include inorganic bases such as a hydroxide of an alkali metal, a hydroxide of an alkaline earth metal and ammonia, and organic bases such as an aliphatic amine compound and an alkanolamine compound.

Examples of a hydroxide of an alkali metal described above include a lithium hydroxide, a sodium hydroxide and a potassium hydroxide.

Examples of a hydroxide of an alkaline earth metal include a beryllium hydroxide, a magnesium hydroxide, a calcium hydroxide and a strontium hydroxide.

Among the inorganic bases, a hydroxide of an alkali metal and ammonia are preferable, and in particular, a lithium hydroxide, a sodium hydroxide and ammonia are preferable.

Examples of the alkanolamine compound described above include mono-, di- and tri-C1-C3 alkanolamine compounds such as a monoethanolamine, a diethanolamine, a triethanolamine, a monopropanolamine, a dipropanolamine, a tripropanolamine, a methylethanolamine, a dimethylethanolamine and an N-methyldiethanolamine. Among them, tertiary amines are preferable, and in particular, a triethanolamine is preferable.

Examples of the aliphatic amine compound include mono-, di- and tri-C1-C3 amine compounds such as a monomethylamine, a dimethylamine, a trimethylamine, a monoethylamine, a dimethylamine and a trimethylamine. Among them, a triethylamine is preferable.

One type of these neutralizing agents may be used or two or more types may be used together.

[Monomer A]

The monomer A is a monomer in which in formula (1) described above, R is a hydrogen atom, that is, is methacrylic acid.

[Monomer B]

The monomer B is a monomer in which in formula (1) described above, R is a C1-C4 alkyl group.

Examples of the monomer B include methyl methacrylate, ethyl methacrylate, n-propyl methacrylate, isopropyl methacrylate, n-butyl methacrylate and isobutyl methacrylate.

[Monomer C]

The monomer C is a monomer in which in formula (1) described above, R is an aryl group or an aryl C1-C4 alkyl group.

The aryl described above is preferably a C6-C10 aryl group, and in particular, a phenyl group or a naphthyl group is preferable.

Examples of the aryl C1-C4 alkyl group described above include: a phenyl C1-C4 alkyl group in which an alkyl part such as phenyl methyl, phenyl ethyl, phenyl propyl or phenyl butyl is a straight or branched chain and is preferably a straight chain; and a naphthyl C1-C4 alkyl group in which an alkyl part such as naphthyl methyl, naphthyl ethyl, naphthyl propyl or naphthyl butyl is a straight or branched chain and is preferably a straight chain. Among them, a phenyl C1-C4 alkyl group is preferable.

Specific examples of the monomer C include phenyl methacrylate, benzyl methacrylate and phenethyl methacrylate.

[Styrene-Butadiene Resin]

The styrene-butadiene resin described above is often sold in the form of latex (emulsion), and can be easily purchased. Specific examples thereof include: Nipol LX415M, Nipol LX432M, Nipol LX433C, Nipol LX421, Nipol 2507H and Nipol LX303A (made by Nippon Zeon Co., Ltd.); and latexes whose grades are 0695, 0696, 0561, 0589, 0602, 2108, 0533, 0545, 0548, 0568, 0569, 0573, 0597C and 0850Z (made by JSR Corporation). Most of them are liquids whose solid content is 30 to 60% and which are obtained by emulsifying a resin.

Although as the styrene-butadiene resin, any of the latexes described above can be used, among them, a carboxy-modified styrene-butadiene resin is preferably used. Examples of such a resin include: Nipol LX415M, Nipol LX432M, Nipol LX433C, Nipol LX421, 0695, 0696, 0533, 0545, 0548, 0568, 0569, 0573, 0597C and 0850Z; 0695, 0533, 0568, 0597C and 0850Z are preferable.

A single styrene-butadiene resin may be used or two or three types may be used together.

[Water-Soluble Organic Solvent]

Examples of the water-soluble organic solvent described above include: C1-C4 mono-ols such as methanol, ethanol, n-propanol, isopropanol, n-butanol, isobutanol, secondary butanol and tert-butanol; C2-C6 diols such as ethylene glycol, 1,2- or 1,3-propylene glycol, 1,2- or 1,4-butylene glycol, 1,3-pentanediol, 1,5-pentanediol, 1,2-hexanediol and 1,6-hexane diol; C3-C6 triols such as glycerin, hexane-1,2,6-triol and trimethylol propane; carboxylic acid amides such as N,N-dimethylformamide and N,N-dimethylacetamide; heterocyclic ureas such as 2-pyrrolidone, N-methyl-2-pyrrolidone, 1,3-dimethyl-imidazolidin-2-on and 1,3-dimethyl-hexahydro-pyrimido-2-on; ketones and keto alcohols such as acetone, methyl ethyl ketone, 2-methyl-2-hydroxy-pentan-4-on; straight-chain and cyclic ethers such as 1,2-dimethoxy-ethane, tetrahydrofuran and dioxane; di- and tri-C2-C3 alkylene glycols and thioglycols such as diethylene glycol, triethylene glycol, dipropylene glycol and thiodiglycol; poly C2-C3 alkylene glycols (preferably liquids) in which the repeating unit is 4 or more and the molecular weight is about 20000 or less such as tetraethylene glycol, polyethylene glycol (preferably in which the molecular weight is 2000 or less such as 400, 800, 1540 or the like) and polypropylene glycol; poly glyceryl ethers such as diglycerin, triglycerin and polyglycerin; polyoxy C2-C3 alkylene polyglyceryl ethers such as polyoxyethylene polyglyceryl ether and polyoxypropylene polyglyceryl ether; C1-C4 alkyl ethers of polyhydric alcohol such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, triethylene glycol monoethyl ether and triethylene glycol monobutyl ether; cyclic esters and carbonates such as γ-butyrolactone and ethylene carbonate; dimethyl sulfoxide; and acetic acid.

Among them, C2-C6 diols (among them, 1,2-propylene glycol); C3-C6 triols (among them, glycerin); poly glyceryl ethers (among them, diglycerin); and C1-C4 alkyl ethers of polyhydric alcohol (among them, butylcarbitol) are preferable.

One type or a plurality of types of water-soluble organic solvents described above may be used. Among them, polyglyceryl ether (preferably, glycerin and/or diglycerin), C2-C6 diol (preferably, ethylene glycol, 1,2- or 1,3-propylene glycol and more preferably, ethylene glycol and 1,2-propylene glycol) are preferably contained.

[Nonionic Surfactant]

Examples of the nonionic surfactant described above include: ether-based surfactants such as polyoxyethylene nonyl phenyl ether, polyoxyethylene octyl phenyl ether, polyoxyethylene dodecyl phenyl ether, polyoxyethylene oleyl ether, polyoxyethylene lauryl ether and polyoxyethylene alkyl ether; ester-based surfactants such as polyoxyethylene oleic acid ester, polyoxyethylene distearate, sorbitan laurate, sorbitan monostearate, sorbitan monooleate, sorbitan sesquioleate, polyoxyethylene monooleate and polyoxyethylene stearate; acetylene glycol (alcohol)-based surfactants such as 2,4,7,9-tetramethyl-5-decyne-4,7-diol, 3,6-dimethyl-4-octyne-3,6-diol and 3,5-dimethyl-1-hexyne-3-ol; products made by Nissin Chemical Industry Co., Ltd. Surfynol® 104, 105 PG50, 82, 420, 440, 465, 485, DF-110D, Olfine® STG; and polyglycol ether-based surfactants (for example, TergItol® 15-S-7 made by SIGMA-ALDRICH Co., Ltd.). The nonionic surfactants described above can be used singly or by being mixed, and preferably Surfynol-based surfactants and more preferably Surfynol®420, Surfynol®440 and Surfynol®465 are used.

In the present specification, the superscript "RTM" means a registered trade mark.

An example of the range of the content of each of the components in the total mass of the ink composition used for inkjet printing is as follows.

Pigment: normally 1 to 15%, preferably 1 to 10% and more preferably 1 to 7%.

Polymer D: normally 0.1 to 15%, preferably 0.1 to 9% and more preferably 0.2 to 6%.

Styrene-butadiene resin: normally 1 to 20%, preferably 3 to 15% and more preferably 3 to 12%.

Water-soluble organic solvent: normally 10 to 45%, preferably 15 to 38% and more preferably 20 to 35%.

Nonionic surfactant: normally 0.01 to 5%, preferably 0.05 to 3% and more preferably 0.1 to 2.5%.

The remaining parts are water.

A method of preparing the ink composition described above is not particularly limited, but normally the aqueous pigment dispersing liquid containing the pigment and the polymer D is prepared, and thereafter the styrene-butadiene resin, the water-soluble organic solvent, the nonionic surfactant and other components as necessary are added, and thus the ink composition is prepared.

As a method of preparing the pigment dispersing liquid described above, there is a method of dispersing the pigment, the polymer D and the styrene-butadiene resin, together with water or an aqueous solvent, using a sand mill (bead mill), a roll mill, a ball mill, a paint shaker, an ultrasonic dispersing machine or a microfluidizer, and among them, the sand mill (bead mill) is preferable. The preparation of the pigment dispersing liquid using the sand mill (bead mill) is preferably processed under conditions in which the dispersion efficiency is increased such as by using a bead having a small diameter (about 0.01 to 1 mm diameter) to increase the filling rate of beads.

By performing the dispersion under such conditions, it is possible to decrease the size of the particles of the pigment and to obtain the dispersing liquid having satisfactory dispersibility.

After the preparation of the dispersing liquid, components whose particle sizes are large are preferably removed by filtration and/or centrifugation.

For example, when bubbling occurs violently in the preparation of the dispersing liquid described above, in order to reduce it, an extremely small amount of silicone-based, acetylene glycol-based or the like defoamer may be added. Preferably, since some defoamers inhibit the dispersion of the pigment and the formation into minute particles, a defoamer that does not produce such adverse effects is appropriately selected and used.

As described above, the polymer D can be used as the dispersing agent. The polymer D may be adsorbed to part of the surface of the pigment or may coat the entire surface of the pigment (referred to as a microencapsulated pigment or the like). The latter is preferable.

When the entire surface of the pigment is coated by the polymer D described above (in other words, the pigment is microencapsulated), any known microencapsulation method can be used. The methods are broadly divided into two methods, that is, a physical/mechanical method and a chemical method. As the latter chemical method, a surface precipitation method, a kneading method, an interfacial polymerization method (also referred to as a surface polymerization method) and the like are proposed. Among them, the surface precipitation method includes an acid precipitation method and a phase inversion emulsification method.

When the polymer D is microencapsulated by the pigment, any method may be used, and the method is not particularly limited. Among them, the surface precipitation method is preferable, and in particular, the phase inversion emulsification method is preferable.

As the phase inversion emulsification method, for example, the following method can be used: an emulsified (emulsion or micro-emulsion) liquid is obtained by mixing a solution of a hydrophobic organic solvent where a dispersing agent is dissolved with a liquid containing a neutralizing agent and water, furthermore, a pigment is added to perform mixing and dispersion, the solvent is removed and thus an aqueous pigment dispersing liquid is obtained.

The average particle diameter of the pigment in the aqueous pigment dispersing liquid prepared as described above is normally 200 nm or less, is preferably 50 to 150 nm and is more preferably 60 to 120 nm. The average particle diameter is made to fall within this range, and thus the dispersion stability and the discharge stability are excellent, and the dyeing concentration is increased. The average particle diameter can be measured with a laser light scattering method.

In order to enhance the storage stability, the pH of the ink composition is preferably 5 to 11, and is more preferably 7 to 10.

The surface tension of the ink composition at 25° C. is preferably 10 to 50 mN/m, and is more preferably 20 to 40 mN/m.

Furthermore, the viscosity of the ink composition at 25° C. is preferably 30 mPa·s or less, is more preferably 20 mPa·s or less and is particularly 2 to 10 mPa·s.

The pH and the surface tension of the ink composition of the present invention can be adjusted as necessary by a pH adjusting agent and a surfactant which will be described later.

The content of the polymer D can be indicated by a value called a partial original ratio, and the partial original ratio can be determined by the formula below.

partial original ratio=number of parts of the polymer D/number of parts of the pigment In the present invention, the partial original ratio is normally 0.1 to 1.0, is preferably 0.1 to 0.6 and is more preferably 0.2 to 0.4. The partial original ratio falls within this range, and thus it is possible to obtain a pigment dispersing liquid excellent in stability and a satisfactory dyed product.

In the preparation of the ink composition described above, an ink preparation agent other than those described above can be used as necessary. Examples thereof include: an antiseptic/antifungal agent, a pH adjusting agent, a chelating agent, a rust preventive agent, a water-soluble ultraviolet absorbing agent, a water-soluble polymer compound, an antioxidant and a surfactant. These ink preparation agents will be described below.

Examples of the antiseptic agent include: sodium dehydroacetate, sodium benzoate, sodium pyridinethione-1-oxide, p-hydroxybenzoic acid ethyl ester, 1,2-benzisothiazolin-3-on and its salts.

Examples of the antifungal agent include: the compounds of an organic sulfur-based, an organic nitrogen sulfur-based, an organic halogen-based, a halo aryl sulfone-based, an iodopropargyl-based, a haloalkylthio-based, a nitrile-based, a pyridine-based, an 8-oxy-quinoline-based, a benzothiazole-based, an isothiazoline-based, a dithiol-based, a pyridine oxide-based, a nitropropane-based, an organic tin-based, a phenolic-based, a quaternary ammonium salt-based, a triaz-ine-based, a thiazine-based, an anilide-based, an adamantane-based, a dithiocarbamate-based, a brominated indanone-based, a benzyl bromoacetate-based and an inorganic salt-based.

Specific examples of the organic halogen-based compound include sodium pentachlorophenol. Specific examples of the pyridine oxide-based compound include sodium 2-pyridine thiol-1-oxide. Specific examples of the isothiazoline-based compound include: 1,2-benzisothiazolin-3-on, 2-n-octyl-4-isothiazolin-3-on, 5-chloro-2-methyl-4-isothiazolin-3-on, 5-chloro-2-methyl-4-isothiazolin-3-on magnesium chloride, 5-chloro-2-methyl-4-isothiazolin-3-on calcium chloride and 2-methyl-4-isothiazolin-3-on calcium chloride. Other specific examples of the antiseptic/antifungal agent include: anhydrous sodium acetate, sodium sorbate and sodium benzoate, and products Proxel®GXL (S) and Proxel®XL-2 (S) made by Arch Chemicals Co., Ltd.

As long as the pH adjusting agent does not adversely affect the prepared ink and can perform control to make the pH of the ink fall within a range of, for example, 5 to 11, an arbitrary substance can be used. For example, the same ones described in the "neutralizing agent used for the neutralization of the polymer D" can be used.

Other specific examples include: carbonates of alkali metals such as lithium carbonate, sodium carbonate, sodium hydrogen carbonate and potassium carbonate; alkali metal salts of organic acids such as sodium silicate and potassium acetate; and phosphates such as phosphoric acid disodium.

Specific examples of the chelating agent include: disodium ethylenediaminetetraacetate, sodium nitrilotriacetate, sodium hydroxyethyl ethylenediamine triacetate, sodium diethylenetriamine pentaacetate and sodium uracil diacetate.

Specific examples of the rust preventive agent include: acid sulfite, sodium thiosulfate, ammonium thioglycolate, diisopropyl ammonium nitrite, pentaerythritol tetranitrate and dicyclohexyl ammonium nitrite.

Specific examples of the water-soluble ultraviolet absorbing agent include: a sulfonated benzophenone-based compound, a benzotriazole-based compound, a salicylic acid-based compound, a cinnamic acid-based compound and a triazine-based compound.

Specific examples of the water-soluble polymer compound include: polyvinyl alcohol, a cellulose derivative, a polyamine and a polyimine.

As the antioxidant, for example, various organic-based and metal complex-based anti-fading agents can be used. Specific examples of the organic-based anti-fading agent described above include: hydroquinones, alkoxy phenols, dialkoxy phenols, phenols, anilines, amines, indanes, chromanes, alkoxyanilines and heterocycles.

The inkjet printing method described above is a method of discharging the droplets of the ink composition in response to a recording signal and attaching them on the record-receiving material to perform printing. An ink nozzle and the like of the inkjet printer used in the printing are not particularly limited, and it is possible to select them as necessary according to the purpose.

As the printing method described above, any of the following known methods can be used: for example, a charge control method of utilizing electrostatic attraction to discharge the ink; a drop on-demand method (pressure pulse method) of utilizing the vibration pressure of a piezoelectric element; an acoustic inkjet method of converting an electrical signal into an acoustic beam, applying it to the ink and utilizing the radiation pressure thereof to discharge the ink; and a thermal inkjet method of heating the ink to form bubbles and utilizing the generated pressure.

Examples of the record-receiving material in the inkjet printing method described above include a fiber selected from a group consisting of polyester, cellulose, polyamide and a natural fiber.

Examples of the polyester fiber include a fiber whose main component is polyethylene terephthalate.

Examples of the cellulose fiber include cotton, rayon, a triacetate fiber, a diacetate fiber.

Examples of the polyamide fiber include a nylon fiber.

Examples of the natural fiber include silk and wool.

The fiber described above may be a fiber of a single material or may be a mixed fiber thereof. In these fibers, an ink-receiving layer (bleeding prevention layer) may be provided. A method of forming the ink-receiving layer in the fiber is a technology that is known and used, and the fiber including the ink-receiving layer is available in a commercial field. It is possible to provide the ink-receiving layer in the fiber by selecting, as necessary, a constituent component, a formation method and the like from technology that is known and used. As long as the ink-receiving layer has its inherent function, it is not particularly limited.

The inkjet dyeing method described above is a method of dyeing, by steaming or baking processing, the pigment contained in the ink composition attached on the record-receiving material by using the inkjet printing method and thereby performing dyeing.

As the steaming processing, for example, processing is performed, normally at 80 to 250° C. and preferably at 170 to 180° C., normally for 10 seconds to 30 minutes and preferably for about 10 minutes, and thus it is possible to perform dyeing (moist heat fixation).

As the baking (thermosol) processing, processing is performed, normally at 80 to 250° C. and preferably at 190 to 210° C., normally for 10 seconds to 30 minutes and preferably for about 60 to 180 seconds, and thus it is possible to perform dyeing (dry heat fixation).

In this way, it is possible to obtain a dyed product dyed by the inkjet dyeing method described above. The dyed product means the record-receiving material that is dyed by the inkjet dyeing method described above.

Preferably, in order for a fiber to be printed by the inkjet printing method described above, for example, a container containing the ink composition described above is set at a predetermined position of an inkjet printer for printing capable of transporting a fabric, and the record-receiving material is printed by the inkjet printing method described above.

In the inkjet printing method described above, the type of pigment contained in the ink composition is selected and is used as an ink set, and thus it is possible to perform full-color printing. For example, it may be used as an ink set of four colors, that is, yellow, red, blue and black, and as necessary, pigments of colors such as green, violet, orange to brown and the like may also be selected to use an ink set of four or more colors.

In the ink composition described above, the filling of an inkjet head with the ink is satisfactory, and it is possible to stably discharge the ink without the bending of discharge and faint printing at the time of printing. It is possible to satisfactorily perform discharge without clogging the nozzle both when the printing is continuously performed and when the printing is intermittently performed.

The storage stability at the time of storage is satisfactory, and if water or the like in the ink composition is lost, and thus the ink composition is dried, the redispersibility is extremely satisfactory.

In the dyeing of the fiber, no bleeding occurs and high coloring is achieved, and in the full-color printing, adjacent colors are prevented from being mixed and thus high quality is achieved.

Various types of toughness such as light resistance and water resistance after dyeing are also excellent.

EXAMPLES

Although the present invention will be specifically described below using examples, the present invention is not limited to the examples below in any way.

Preparation Example 1

Hairosu X VS-1202 (9 parts) made by Star light PMC Corporation was dissolved in 2-butanone (30 parts). A liquid where 0.9 parts of sodium hydroxide was dissolved in ion-exchanged water (76 parts) was added to this solution, and was agitated for one hour to obtain an emulsified liquid. C. I. Pigment Red 122 (30 parts of HPC Red 1220 made by High Performance Colours Ltd.) was added to the obtained liquid, and dispersion processing was performed under conditions of 1500 rpm with a sand grinder for 15 hours. The ion-exchanged water (150 parts) was dropped into the obtained liquid, and thereafter dispersion beads were filtered. 2-butanone and one part of water in the obtained mother liquid were concentrated by being evaporated under reduced pressure with an evaporator, with the result that a dispersing liquid with a solid content of 12.2% was obtained. This is the "dispersing liquid 1." The solid content in the aqueous solution was determined with MS-70 made by A&D Company, Ltd. by a dry weight method. The average particle diameter of the pigment included in the dispersing liquid 1 was 181 nm, and the viscosity of the dispersing liquid 1 at 25° C. was 6.7 mPa·s.

Preparation Example 2

A dispersing liquid was obtained in the same manner as in Preparation Example 1 except that instead of C. I. Pigment Red 122 used in Preparation Example 1 described above, C. I. Pigment Black 7 was used. This is the "dispersing liquid 2." The solid content of the dispersing liquid 2 was 11.9%, the average particle diameter of the pigment included in the dispersing liquid 2 was 88 nm, and the viscosity of the dispersing liquid 2 at 25° C. was 4.6 mPa·s.

Preparation Example 3

A dispersing liquid was obtained in the same manner as in Preparation Example 1 except that instead of C. I. Pigment Red 122 used in Preparation Example 1 described above, C. I. Pigment Blue 15:3 was used. This is the "dispersing liquid 3." The solid content of the dispersing liquid 3 was 12.1%, the average particle diameter of the pigment included in the dispersing liquid 3 was 102 nm, and the viscosity of the dispersing liquid 3 at 25° C. was 6.2 mPa·s.

Preparation Example 4

A dispersing liquid was obtained in the same manner as in Preparation Example 1 except that instead of C. I. Pigment Red 122 used in Preparation Example 1 described above, C. I. Pigment Yellow 155 was used. This is the "dispersing liquid 4." The solid content of the dispersing liquid 4 was 12.2%, the average particle diameter of the pigment included in the dispersing liquid 4 was 82 nm, and the viscosity of the dispersing liquid 4 at 25° C. was 2.4 mPa·s.

Examples 5 to 16

The dispersing liquids 1 to 4 described above and individual components described in table 1 below were mixed, and foreign substances were filtered with a membrane filter of 5 μm, with the result that the inks of Examples 5 to 16 used for evaluation tests were obtained. The individual inks were adjusted such that the pigment content thereof was 6%. Comparative Examples 1 to 4

Instead of the styrene-butadiene resin used in the individual examples, Pamarin UA-150 [made by Sanyo Chemical Industries Ltd.], which is polycarbonate-based urethane resin latex, was used and individual components in table 2 below were mixed, with the result that the inks of Comparative Examples 1 to 4 used for evaluation tests were prepared. The individual inks were adjusted such that the pigment content thereof was 6%.

Abbreviations and the like in tables 1 and 2 below have the following meanings. A blank space means that the component thereof is not contained.

DG: diglycerol
1,2-PG: 1,2-propylene glycol
0533: latex whose grade is 0533 made by JSR Corporation
0568: latex whose grade is 0568 made by JSR Corporation
0597C: latex whose grade is 0597C made by JSR Corporation
SF420: Surfynol 420
DF-110D: Surfynol DF-110D
TEA: triethanolamine
BC: butylcarbitol
UA-150: Pamarin UA-150

TABLE 2

Ink compositions and evaluation results in individual comparative examples

| Components | 1 | 2 | 3 | 4 |
|---|---|---|---|---|
| Dispersing liquid 1 | 49.2 | | | |
| Dispersing liquid 2 | | 50.4 | | |
| Dispersing liquid 3 | | | 49.6 | |
| Dispersing liquid 4 | | | | 49.2 |
| DG | 15 | 15 | 15 | 15 |
| 1,2-PG | 10 | 10 | 10 | 10 |
| UA-150 | 6 | 6 | 6 | 6 |
| SF420 | 0.05 | 0.05 | 0.05 | 0.05 |
| DF-110D | 0.01 | 0.01 | 0.01 | 0.01 |
| TEA | 0.05 | 0.05 | 0.05 | 0.05 |
| BC | 3 | 3 | 3 | 3 |
| Water | Remaining parts | | | |
| Total | 100 | 100 | 100 | 100 |
| Redispersibility | D | D | D | D |
| Stability | A | D | A | A |

[A. Redispersibility Test]

5 ml of the ink composition in Examples 5 to 16 and Comparative Examples 1 to 4 was placed on a glass dish, and was evenly rotated so as to be spread thinly on the bottom of the dish, and thereafter excessive liquid was discarded. This was dried with a dryer at 35° C. for 4 hours. Thereafter 2 ml of ion-exchanged water was dropped at room temperature and the redispersibility of the dried ink composition was visually evaluated on a scale of 1 to 4 below.

Since even after drying, the entire redispersed ink composition is returned to liquid form without production of any residue, it is possible to make a visual determination. The results are shown in tables 1 and 2 above.

A: No residue was produced, and the entirety was redispersed.

B: A small amount of residue was left but almost all was redispersed.

TABLE 1

Ink compositions and evaluation results in individual examples

| Components | 5 | 6 | 7 | 8 | 9 | 10 | 11 | 12 | 13 | 14 | 15 | 16 |
|---|---|---|---|---|---|---|---|---|---|---|---|---|
| Dispersing liquid 1 | 49.2 | | | | 49.2 | | | | 49.2 | | | |
| Dispersing liquid 2 | | 50.4 | | | | 50.4 | | | | 50.4 | | |
| Dispersing liquid 3 | | | 49.6 | | | | 49.6 | | | | 49.6 | |
| Dispersing liquid 4 | | | | 49.2 | | | | 49.2 | | | | 49.2 |
| DG | 15 | 15 | 15 | 15 | 15 | 15 | 15 | 15 | 15 | 15 | 15 | 15 |
| 1,2-PG | 10 | 10 | 10 | 10 | 10 | 10 | 10 | 10 | 10 | 10 | 10 | 10 |
| 0533 | 6 | 6 | 6 | 6 | | | | | | | | |
| 0568 | | | | | 6 | 6 | 6 | 6 | | | | |
| 0597C | | | | | | | | | 6 | 6 | 6 | 6 |
| SF420 | 0.05 | 0.05 | 0.05 | 0.05 | 0.05 | 0.05 | 0.05 | 0.05 | 0.05 | 0.05 | 0.05 | 0.05 |
| DF-110D | 0.01 | 0.01 | 0.01 | 0.01 | 0.01 | 0.01 | 0.01 | 0.01 | 0.01 | 0.01 | 0.01 | 0.01 |
| TEA | 0.05 | 0.05 | 0.05 | 0.05 | 0.05 | 0.05 | 0.05 | 0.05 | 0.05 | 0.05 | 0.05 | 0.05 |
| BC | 3 | 3 | 3 | 3 | 3 | 3 | 3 | 3 | 3 | 3 | 3 | 3 |
| Water | Remaining parts | | | | | | | | | | | |
| Total | 100 | 100 | 100 | 100 | 100 | 100 | 100 | 100 | 100 | 100 | 100 | 100 |
| Redispersibility | A | A | A | A | A | A | A | A | A | A | A | A |
| Stability | A | A | A | A | A | A | A | A | A | A | A | A |

C: A large amount of residue was left and a small amount was redispersed.

D: No amount was redispersed.

[B. Stability Test]

Each of the ink compositions in the individual examples and the comparative examples was put into a glass sample bottle with a lid, and was left in a dryer at 60° C. for 3 days. The sample bottles were gently turned upside down, and whether or not a precipitate was present was visually evaluated on a scale of 1 to 2 below as the storage stability. The results are shown in tables 1 and 2 above.

A: No precipitate was confirmed.

D: A precipitate was clearly confirmed.

It was found clearly from the results above that the ink compositions in Examples 5 to 16 were extremely excellent in redispersibility and storage stability as compared with the ink compositions in Comparative Examples 1 to 4.

Preparation Example 5

6 parts of a polymer dispersing agent (block copolymer B) obtained by performing a follow-up test on synthesis example 4 in International publication No. 2013/115071 was dissolved in 30 parts of 2-butanone, and a uniform solution was obtained. A liquid where 0.44 parts of sodium hydroxide was dissolved in 41 parts of ion-exchanged water was added thereto, and was agitated for one hour, with the result that an emulsified solution in which the polymer dispersing agent was dissolved was prepared. Here, no crystal was precipitated. 20 parts of C. I. Pigment Red 122 (HPC Red 1220 made by High Performance Colours Ltd.) was added thereto, and dispersion processing was performed with a sand grinder. The dispersion was performed under conditions of 1500 rpm for 15 hours, and thus a liquid was obtained. 100 parts of ion-exchanged water was dropped into the obtained liquid, this liquid was filtered to remove dispersion beads and thereafter 2-butanone and water were evaporated under reduced pressure with an evaporator, with the result that a dispersing liquid with a solid content of 15.1% was obtained. This is the "dispersing liquid 5." The average particle diameter of the pigment included in the dispersing liquid 5 was 96 nm, and the viscosity of the dispersing liquid 5 at 25° C. was 6.0 mPa·s.

Preparation Example 6

6 parts of a polymer dispersing agent (block copolymer A) obtained by performing a follow-up test on synthesis example 3 in International publication No. 2013/115071 were dissolved in 30 parts of 2-butanone, and a uniform solution was obtained. A liquid where 0.45 parts of sodium hydroxide was dissolved in 42 parts of ion-exchanged water was added thereto, and was agitated for one hour, with the result that an emulsified solution in which the polymer dispersing agent was dissolved was prepared. Here, no crystal was precipitated. 20 parts of C. I. Pigment Red 122 (HPC Red 1220 made by High Performance Colours Ltd.) was added thereto, and dispersion processing was performed with a sand grinder. The dispersion was performed under conditions of 1500 rpm for 15 hours, and thus a liquid was obtained. 100 parts of ion-exchanged water was dropped into the obtained liquid, this liquid was filtered to remove dispersion beads and thereafter 2-butanone and water were evaporated under reduced pressure with an evaporator, with the result that a dispersing liquid with a solid content of 13.7% was obtained. This is the "dispersing liquid 6." The average particle diameter of the pigment included in the dispersing liquid 6 was 80 nm, and the viscosity of the dispersing liquid 6 at 25° C. was 6.7 mPa·s.

Preparation Example 7

6 parts of a polymer dispersing agent (block copolymer C) obtained by performing a follow-up test on synthesis example 5 in International publication No. 2013/115071 was dissolved in 30 parts of 2-butanone, and a uniform solution was obtained. A liquid where 0.43 parts of sodium hydroxide was dissolved in 42 parts of ion-exchanged water was added thereto, and was agitated for one hour, with the result that an emulsified solution in which the polymer dispersing agent was dissolved was prepared. Here, no crystal was precipitated. 20 parts of C. I. Pigment Red 122 (HPC Red 1220 made by High Performance Colours Ltd.) was added thereto, and dispersion processing was performed with a sand grinder. The dispersion was performed under conditions of 1500 rpm for 15 hours, and thus a liquid was obtained. 100 parts of ion-exchanged water was dropped into the obtained liquid, this liquid was filtered to remove dispersion beads and thereafter 2-butanone and water were evaporated under reduced pressure with an evaporator, with the result that a dispersing liquid with a solid content of 13.9% was obtained. This is the "dispersing liquid 7." The average particle diameter of the pigment included in the dispersing liquid 7 was 102 nm, and the viscosity of the dispersing liquid 7 at 25° C. was 7.4 mPa·s.

Preparation Example 8

6 parts of a polymer dispersing agent (block copolymer D) obtained by performing a follow-up test on synthesis example 6 in International publication No. 2013/115071 was dissolved in 30 parts of 2-butanone, and a uniform solution was obtained. A liquid where 0.44 parts of sodium hydroxide was dissolved in 41 parts of ion-exchanged water was added thereto, and was agitated for one hour, with the result that an emulsified solution in which the polymer dispersing agent was dissolved was prepared. Here, no crystal was precipitated. 20 parts of C. I. Pigment Red 122 (HPC Red 1220 made by High Performance Colours Ltd.) was added thereto, and dispersion processing was performed with a sand grinder. The dispersion was performed under conditions of 1500 rpm for 15 hours, and thus a liquid was obtained. 100 parts of ion-exchanged water was dropped into the obtained liquid, this liquid was filtered to remove dispersion beads and thereafter 2-butanone and water were evaporated under reduced pressure with an evaporator, with the result that a dispersing liquid with a solid content of 12.7% was obtained. This is the "dispersing liquid 8." The average particle diameter of the pigment included in the dispersing liquid 8 was 102 nm, and the viscosity of the dispersing liquid 8 at 25° C. was 20.2 mPa·s.

Preparation Example 9

6 parts of a polymer dispersing agent (block copolymer E) obtained by performing a follow-up test on synthesis example 7 in International publication No. 2013/115071 was dissolved in 30 parts of 2-butanone, and a uniform solution was obtained. A liquid where 0.38 parts of sodium hydroxide was dissolved in 88 parts of ion-exchanged water was added thereto, and was agitated for one hour, with the result that an emulsified solution in which the polymer dispersing agent was dissolved was prepared. Here, no crystal was precipitated. 20 parts of C. I. Pigment Red 122 (HPC Red 1220 made by High Performance Colours Ltd.) was added thereto, and dispersion processing was performed with a sand grinder. The dispersion was performed under conditions of 1500 rpm for 15 hours, and thus a liquid was obtained. 100 parts of ion-exchanged water was dropped into the obtained liquid, this liquid was filtered to remove dispersion beads and thereafter 2-butanone and water were evaporated under reduced pressure with an evaporator, with the result that a dispersing liquid with a solid content of 11.7% was obtained. This is the "dispersing liquid 9." The average particle diameter of the pigment included in the dispersing liquid 9 was 104 nm, and the viscosity of the dispersing liquid 9 at 25° C. was 3.0 mPa·s.

Preparation Example 10

6 parts of a polymer dispersing agent (block copolymer F) obtained by performing a follow-up test on synthesis example 8 in International publication No. 2013/115071 was dissolved in 30 parts of 2-butanone, and a uniform solution was obtained. A liquid where 0.51 parts of sodium hydroxide was dissolved in 41 parts of ion-exchanged water was added thereto, and was agitated for one hour, with the result that an emulsified solution in which the polymer dispersing agent was dissolved was prepared. Here, no crystal was precipitated. 20 parts of C. I. Pigment Red 122 (HPC Red 1220 made by High Performance Colours Ltd.) was added thereto, and dispersion processing was performed with a sand grinder. The dispersion was performed under conditions of 1500 rpm for 15 hours, and thus a liquid was obtained. 100 parts of ion-exchanged water was dropped into the obtained liquid, this liquid was filtered to remove dispersion beads and thereafter 2-butanone and water were evaporated under reduced pressure with an evaporator, with the result that a dispersing liquid with a solid content of 12.68% was obtained. This is the "dispersing liquid 10." The average particle diameter of the pigment included in the dispersing liquid 10 was 110 nm, and the viscosity of the dispersing liquid 10 at 25° C. was 10.4 mPa·s.

Preparation Example 11

A dispersing liquid whose solid content was 12.9% was obtained in the same manner as in Preparation Example 6 except that instead of C. I. Pigment Red 122, C. I. Pigment Black 7 was used. This is the "dispersing liquid 11." The average particle diameter of the pigment included in the dispersing liquid 11 was 88 nm, and the viscosity of the dispersing liquid 11 at 25° C. was 4.6 mPa·s.

Preparation Example 12

A dispersing liquid whose solid content was 12.4% was obtained in the same manner as in Preparation Example 6 except that instead of C. I. Pigment Red 122, C. I. Pigment Blue 15:3 was used. This is the "dispersing liquid 12." The average particle diameter of the pigment included in the dispersing liquid 12 was 102 nm, and the viscosity of the dispersing liquid 12 at 25° C. was 6.2 mPa·s.

Preparation Example 13

A dispersing liquid whose solid content was 14.1% was obtained in the same manner as in Preparation Example 6 except that instead of C. I. Pigment Red 122, C. I. Pigment Yellow 155 was used. This is the "dispersing liquid 13." The average particle diameter of the pigment included in the dispersing liquid 13 was 82 nm, and the viscosity of the dispersing liquid 13 at 25° C. was 2.4 mPa·s.

Preparation Example 14

4 parts of a polymer dispersing agent (block copolymer A) obtained by performing a follow-up test on synthesis example 3 in International publication No. 2013/115071 was dissolved in 25 parts of 2-butanone, and a uniform solution was obtained. A liquid where 0.45 parts of sodium hydroxide was dissolved in 42 parts of ion-exchanged water was added thereto, and was agitated for one hour, with the result that an emulsified solution in which the polymer dispersing agent was dissolved was prepared. Here, no crystal was precipitated. 40 parts of TIPAQUE CR-50-2 (Ishihara Sangyo Kaisha, Ltd.) was added thereto, and dispersion processing was performed with a sand grinder. The dispersion was performed under conditions of 1500 rpm for 15 hours, and thus a liquid was obtained. 100 parts of ion-exchanged water was dropped into the obtained liquid, this liquid was filtered to remove dispersion beads and thereafter 2-butanone and water were evaporated under reduced pressure with an evaporator, with the result that a dispersing liquid with a solid content of 30.0% was obtained. This is the "dispersing liquid 14." The average particle diameter of the pigment included in the dispersing liquid 14 was 266 nm, and the viscosity of the dispersing liquid 14 at 25° C. was 4.0 mPa·s.

Examples 17 to 21

The dispersing liquid 6 and the dispersing liquids 11 to 13 described above and individual components described in table 3 below were mixed, and foreign substances were filtered with a membrane filter of 5 μm, with the result that the ink compositions of Examples 17 to 21 used for evaluation tests were obtained. The individual ink compositions were adjusted such that the pigment content thereof was 6%.

Abbreviations and the like and blanks in table 3 below have the same meanings as in tables 1 and 2 above. "0850Z" means the latex whose grade is 0850Z made by JSR Corporation.

The redispersibility of the dried ink composition was visually evaluated on a scale of 1 to 4 described above in the same manner as in "A: Redispersibility test" except that, instead of the ink compositions in Examples 5 to 16 and Comparative Examples 1 to 4, the individual ink compositions obtained in Examples 17 to 21 described above were used. The results are shown in Table 3 below.

TABLE 3

| | Ink compositions and evaluation results in individual examples | | | | |
|---|---|---|---|---|---|
| Components | 17 | 18 | 19 | 20 | 21 |
| Dispersing liquid 6 | 43.8 | | | | |
| Dispersing liquid 11 | | 46.5 | | | |
| Dispersing liquid 12 | | | 48.4 | | |
| Dispersing liquid 13 | | | | 42.6 | |
| Dispersing liquid 14 | | | | | 43.3 |
| DG | 15 | 15 | 15 | 15 | 15 |
| 1,2-PG | 10 | 10 | 10 | 10 | 10 |
| 0533 | 6 | | | | |
| 0568 | | 6 | 6 | | |
| 0597C | | | | 6 | |
| 0850Z | | | | | 6 |

TABLE 3-continued

| | Ink compositions and evaluation results in individual examples | | | | |
|---|---|---|---|---|---|
| Components | 17 | 18 | 19 | 20 | 21 |
| SF420 | 0.05 | 0.05 | 0.05 | 0.05 | 0.05 |
| DF-110D | 0.01 | 0.01 | 0.01 | 0.01 | 0.01 |
| TEA | 0.05 | 0.05 | 0.05 | 0.05 | 0.05 |
| BC | 3 | 3 | 3 | 3 | 3 |
| Water | Remaining parts | | | | |
| Total | 100 | 100 | 100 | 100 | 100 |
| Redispersibility | A | A | A | A | A |

It was found clearly from the results above that the ink compositions in Examples 17 to 21 were extremely excellent in redispersibility as with those in Examples 5 to 16.

INDUSTRIAL APPLICABILITY

The pigment ink of the present invention is extremely useful as an inkjet printing ink.

The invention claimed is:

1. An ink composition comprising a pigment; water; a polymer D; a styrene-butadiene resin; a water-soluble organic solvent; and an nonionic surfactant, wherein
the polymer D is formed with at least two types of monomers selected from a group consisting of a monomer A, a monomer B, and a monomer C each represented by formula (1) below,
the monomer A is a monomer in which R is a hydrogen atom in formula (1) below,
the monomer B is a monomer in which R is a C1-C4 alkyl group in formula (1) below, and
the monomer C is a monomer in which R is an aryl group or an aryl C1-C4 alkyl group in formula (1) below

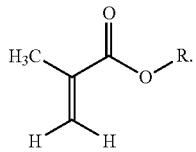

(1)

2. The ink composition according to claim 1, wherein contents of individual components in a total mass of the ink composition are as follows:
the pigment: 1 to 15 mass %,
the polymer D: 0.1 to 15 mass %,
the styrene-butadiene resin: 1 to 20 mass %,
the water-soluble organic solvent: 10 to 45 mass %,
the nonionic surfactant: 0.01 to 5 mass % and
a remaining part is water.

3. The ink composition according to claim 1, wherein the styrene-butadiene resin is a carboxy-modified styrene-butadiene resin.

4. The ink composition according to claim 1, wherein the water-soluble organic solvent comprises a polyglyceryl ether and a C2-C6 diol.

5. The ink composition according to claim 1, wherein at 25° C., a surface tension is 20 to 40 mN/m, and a viscosity is 2 to 10 mPa·s.

6. An inkjet printing method comprising:
discharging, in response to a recording signal, a droplet of the ink composition according to claim 1;
attaching the droplet on a record-receiving material, thereby performing printing.

7. The inkjet printing method according to claim 6, wherein the record-receiving material is a fiber selected from a group consisting of polyester, cellulose, polyamide and a natural fiber, a mixed fiber containing the fiber, or a fabric containing the fiber.

8. The inkjet printing method according to claim 6, further comprising dyeing, to the record-receiving material, the pigment comprised in the ink composition by steaming or baking processing.

9. The inkjet printing method according to claim 8, wherein the steaming or baking processing is performed at 80 to 250° C. for 10 seconds to 30 minutes.

10. A dyed product that is dyed by the inkjet printing method according to claim 8.

* * * * *